Figure 1:
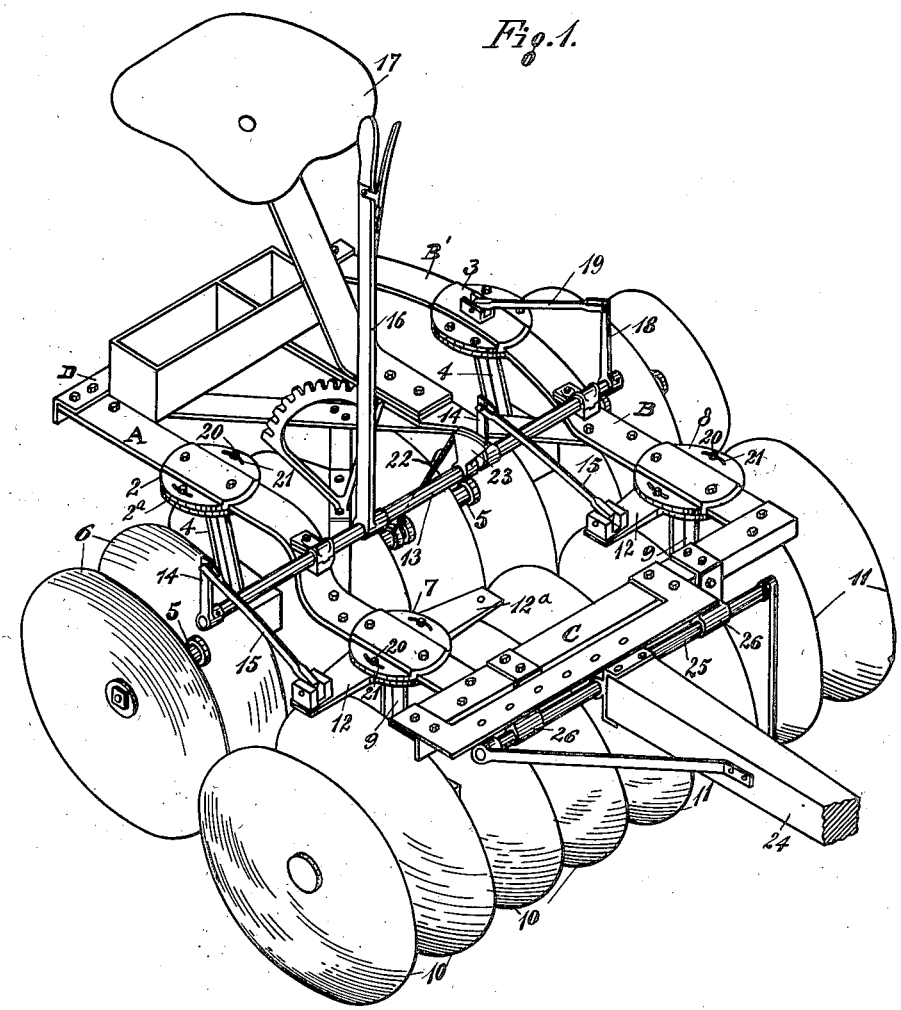

W. C. KING.
DISK HARROW.
APPLICATION FILED OCT. 19, 1908.

917,455.

Patented Apr. 6, 1909.
2 SHEETS—SHEET 1.

WITNESSES:

INVENTOR.
William C. King
BY
ATTORNEY.

W. C. KING.
DISK HARROW.
APPLICATION FILED OCT. 19, 1908.
917,455.
Patented Apr. 6, 1909.
2 SHEETS—SHEET 2.
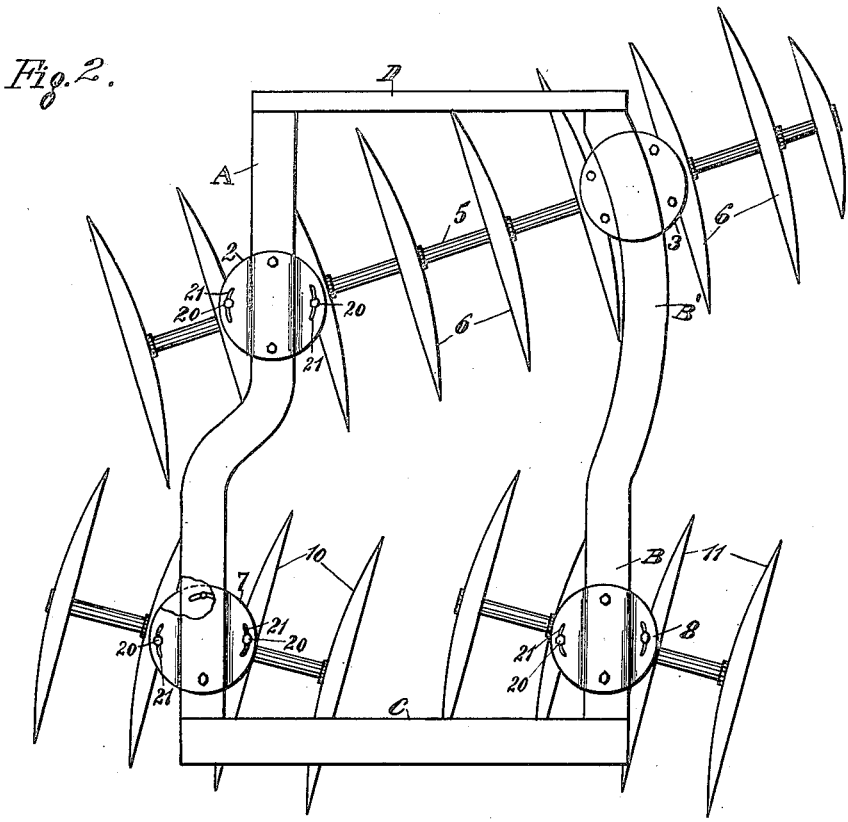
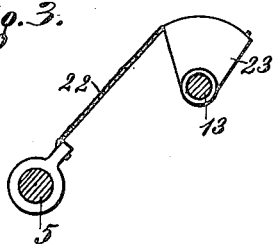
WITNESSES:
INVENTOR.
William C. King.
BY
ATTORNEY.

UNITED STATES PATENT OFFICE.

WILLIAM C. KING, OF CAMPBELL, CALIFORNIA.

DISK HARROW.

No. 917,455.　　　　　Specification of Letters Patent.　　　　Patented April 6, 1909.

Application filed October 19, 1908. Serial No. 458,411.

*To all whom it may concern:*

Be it known that I, WILLIAM C. KING, citizen of the United States, residing at Campbell, in the county of Santa Clara and State of California, have invented new and useful Improvements in Disk Harrows, of which the following is a specification.

My invention relates to apparatus for cultivating the ground, of that class known as "disk harrow."

It consists in the combination of mechanism, and in details of construction which will be more fully explained by reference to the accompanying drawings, in which—

Figure 1 is a perspective view of the harrow. Fig. 2 is a plan. Fig. 3 is a detail section of the stay rope.

The frame of my machine consists of side bars A and B, and transverse front and rear end bars C and D bolted thereto to form a rigid structure. One of the frames B has the rear portion of its length curved on an arc of a circle, of which a point on the opposite frame A is the center. Each of these frames has mounted upon it a turntable, one being mounted upon the frame A, and the other, 3, upon the frame B. From these tables, arms or standards 4 extend downwardly, and in their lower ends are journal-boxes within which a shaft 5 is turnable. Upon this shaft a series of concavo-convex disks 6 are fixed; these disks being of any suitable or desired number, and extending across the machine from one side to the other, as shown in my former patents dated Sept. 25, 1906, No. 831,789 and Jan. 29, 1907, No. 842,671.

Upon the front portion of the frames A and B are tables 7 and 8, these having standards 9 extending downwardly, and upon these standards are supported the shafts of two independent series of plow disks 10 and 11. The front shafts are independently turnable with the tables 7 and 8 as a center of turning. The rear shaft is continuous, and is turnable about the axis 2 as its center of oscillation; consequently the part 3 is slidable upon the arc B' of the frame B, so that the end of the shaft and the disks upon that side are moved in a corresponding arc, while the ones contiguous to the pivot point are turned in unison with the outer ones, but have a very small absolute travel.

The tables, both front and rear, are all operated in unison as follows: The front tables have arms 12 projecting transversely to the line of travel of the machine. The table 8 upon the left side of the machine has a single arm, while the table 7 upon the right side has two arms for a purpose to be hereafter described. 13 is a shaft journaled in boxes upon the frame A and B, and this shaft has rocker-arms 14 carried by it. 15 are connecting rods or pitmen, uniting the ends of the rocker-arms, with the projecting arms 12 of the tables 7 and 8, so that by rocking the shaft 13 it will be seen that being connected with the arms which project in the same direction, the shafts of both sets of disks 10 and 11 will be turned in the same direction, and the angle at which the disks enter the ground will be substantially the same. In some cases it may be desirable to invert the disks 11 to one side so that both sets of disks will present their concaved faces outwardly. This is for the purpose of separating earth, as where there are irrigating ditches, and it will be seen that the two sets of disks working outwardly will both throw the dirt outwardly instead of in the same direction. This is effected by turning the table 7 a half revolution so that the second arm 12$^a$ may be brought into line with the pitman 15 and connected with it; after which the turning of the disks and their shafts will be effected in the same manner as when the plow-disks all face in the same direction. In order to rotate the shaft 13, and to provide for these movements, I have shown a hand-lever 16 keyed or otherwise fixed to the shaft 13 having its upper end within easy reach of the operator, who may ride upon the seat as shown at 17. In order to move the outer end of the rear disk shaft, I have shown a rocker-arm 18 also fixed to the shaft 13, and a connecting rod or pitman 19 extends from this rocker-arm to a box upon the slide 3 so that when the lever 16 is moved, this part will be caused to slide upon the arc B' of the side frame, and the whole length of the disk shaft 5, with its disks, will be correspondingly moved, and in unison with the movements of the two series of front disks. In order to allow for these movements, I have shown the tables 2, 7 and 8 carried by the frame, as made in two parts, one fitting above the frame and bolted thereto, as shown in the table 2. The lower portion forms an independent disk 2$^a$ which is turnable with relation to the upper part 2, and is united thereto by bolts 20 passing through curved slots 21 made in the upper part and concentric with the center of the table so that the bolts may travel loosely in the slot to allow the lower part 2ª, which carries the shaft standards 4, to turn in unison with the turning movement of the shaft 5, but to be at the same time firmly united to the upper part 2. The same construction is shown for the tables 7 and 8 which carry the forward shafts. The slide 3 traveling upon the curved arc B', and maintaining a certain position with relation to the center about which it moves, does not require any independent turning movement of its two parts. In order to properly support and stay the outer end of the shaft 5 in its swinging movement, I have shown a flexible connection 22, one end of which is fixed to a box loosely turnable upon said shaft, and the other end passes over a quadrant 23 which is carried by and turnable with a shaft 13. When the lever 16 is thrown forward, it turns the two forward shafts and their plowing disks, as previously described, and at the same time moves the left end of the rear shaft 5 forwardly on the arc B'. The quadrant 23 is so proportioned that, turning with the shaft 13, it just takes up any slack of the chain 22, and thus maintains a bearing and support for the shaft 5. The rearward movement of the lever 16 reverses these operations, and correspondingly lengthens the chain to accommodate the rearward movement of the shaft.

In my present apparatus I have shown the pole 24 as connected with a draft bar 25 which is journaled so as to swivel in boxes 26 which are fixed to the front top frame C, so that the draft is in line with the upper part of the apparatus, instead of being connected at a point below, and more nearly in line with the axes of the plowing disks.

I have found the present device serves to steady the action of the machine, and to prevent the front portion from lifting when the power is applied to move it.

Having thus described my invention, what I claim and desire to secure by Letters Patent is—

1. In an apparatus of the character described, a frame plowing disks, independent shafts upon which two series of said disks are carried at the front, horizontally turnable disks or tables from which said shafts are supported, a continuous rear shaft with plowing disks, a horizontal turning table on one of the side frames forming a support and pivot for the plow shaft, an arc and a slide movable thereon, from which the opposite end of the plow shaft is supported, said arc having its center in the opposite side frame, a shaft journaled upon the frame with rocker-arms, and connections between the rocker-arms and the tables whereby said tables and the plow shafts are turned in unison.

2. In an apparatus of the character described, a main frame with horizontally turnable tables, plowing disk shafts supported from and turnable with the front tables, a continuous rear plow-shaft, a turning table from which one end is supported, an arc and a traveling slide from which the opposite end is supported, a rock-shaft, arms and connections with the movable tables and slide, a quadrant carried on said shaft and a flexible connection between the quadrant and the rear plow shaft.

3. In an apparatus of the character described, a main frame, a shaft carrying plowing disks having a swivel journal support at one end, and a traveling support for the opposite end, a shaft on the frame with a rocker-arm and connection with the traveling end of the shaft, a quadrant mounted on the rock-shaft turnable with the rocker-arm, and a flexible connection between the quadrant and shaft, to support and brace the shaft.

4. In an apparatus of the character described, a cultivating disk-carrying shaft, having a swivel support for one end, and a slidably traveling support for the opposite end, a rock-shaft and connections to advance or retract the movable end, an intermediate bearing for the shaft, a quadrant turnable in unison with the rocker-arm, and a connection between the quadrant and said bearing, whereby the bearing is moved in unison with the outer end to rigidly support the intermediate portion of the shaft.

In testimony whereof I have hereunto set my hand in presence of two subscribing witnesses.

WILLIAM C. KING.

Witnesses:
MATHIAS PEDERSON,
L. H. BALWICK.